(12) United States Patent
Lee (10) Patent No.: US 7,062,774 B2
(45) Date of Patent: Jun. 13, 2006

(54) OPTICAL PICKUP FOR OPTICAL DISK DRIVE AND DRIVING METHOD THEREOF

(75) Inventor: Jin-won Lee, Sungnam (KR)

(73) Assignee: Samsung Electronics Co., Ltd., Suwon-si (KR)

(*) Notice: Subject to any disclaimer, the term of this patent is extended or adjusted under 35 U.S.C. 154(b) by 768 days.

(21) Appl. No.: 09/985,249

(22) Filed: Nov. 2, 2001

(65) Prior Publication Data

US 2002/0075773 A1 Jun. 20, 2002

(30) Foreign Application Priority Data

Dec. 18, 2000 (KR) ............................... 2000-77673

(51) Int. Cl.
*G11B 7/08* (2006.01)
(52) U.S. Cl. ..................................... 720/673
(58) Field of Classification Search ............. 369/44.21; 720/673, 681, 689
See application file for complete search history.

(56) References Cited

U.S. PATENT DOCUMENTS 5,293,363 A * 3/1994 Takeshita .................. 369/44.21

* cited by examiner

*Primary Examiner*—William Korzuch
*Assistant Examiner*—Mark Blouin
(74) *Attorney, Agent, or Firm*—Stein, McEwen & Bui, LLP

(57) ABSTRACT

An optical pickup and driving method for an optical disk drive holding an optical disk includes a base, an object lens, and a slider supporting the object lens, where the object lens focuses a light on a recording surface of the optical disk. An optical head section includes the slider, where an air bearing floats the slider generated between the optical head section and the optical disk. Wire suspensions movably support the optical head section with respect to the base. A driving unit drives the optical head section in a tracking direction and a focusing direction. A latching unit selectively securely positions the optical head section at a predetermined distance away from the optical disk preventing the optical head section from colliding with the optical disk.

14 Claims, 11 Drawing Sheets

OPTICAL PICKUP FOR OPTICAL DISK DRIVE AND DRIVING METHOD THEREOF

CROSS-REFERENCE TO RELATED APPLICATION

This application is based upon and claims priority of Korean Patent Application No. 2000-77673 filed Dec. 18, 2000, the contents being incorporated herein by reference.

BACKGROUND OF THE INVENTION

1. Field of the Invention

The present invention relates to an optical pickup for an optical disk drive, and more particularly, to an optical pickup for adjusting a distance between the optical disk and an object lens and for recording or reproducing data on or from an optical disk maintaining stability from external shock or collision while being floated toward an optical disk by an air bearing.

2. Description of the Related Art

Generally, an optical disk player records or reproduces the data on or from an optical disk such as a CD, CD-ROM, DVD, DVD-ROM, etc. The optical disk player comprises an optical pickup for recording or reproducing the data by focusing a light on the recording surface of the optical disk.

The optical pickup generally includes an object lens for focusing the light on the optical disk, a bobbin for supporting the object lens, a wire spring for movably supporting the bobbin with respect to a base and a driving unit moving the bobbin. Here, the driving unit includes a focusing coil wound around the bobbin for driving the bobbin in a focusing direction of the light, tracking coils for driving the bobbin in a tracking direction, that is, in a diameter direction of the optical disk, and magnets disposed to correspond to the focusing and tracking coils.

In the above conventional construction, the position of an optical head section including the object lens is determined by driving the respective coils. Namely, the optical head is adjustably positioned in the direction toward or away from the optical disk by the electromagnetic force generated when applying the electric current to the focusing coil. The optical head is adjustably positioned in the tracking direction crossing with respect to the focusing direction, by the electromagnetic force generated when applying the electric current to the tracking coils. There may be a focusing error when the light is projected from a light source, incident on the object lens, and focused on the surface of the optical disk. Because the optical head is minutely controlled by the driving method as described above, the focusing error generated from the focused optical signal can be minimized.

The conventional optical pickup having the construction as described above, however, has shortcomings as follows. First, because the electric current should be continuously applied to the focusing coil to move the optical head, power is considerably consumed. Second, because a distance between the optical disk and the lens, which is adjustable by the electromagnetic force, is approximately 1 mm, it is difficult to apply the conventional optical pickup to a drive requiring a distance of several hundred nm, such as a far field or a near field drive having a high density. Third, because it is difficult to avoid a repeated collision between the object lens and the optical disk by external or internal shock, the optical pickup is considerably damaged by shock. Fourth, because a distance between the optical disk and the object lens is of several hundred nm, the disk and the head are easily damaged due to collision incurred while mounting or removing a disk cartridge with the disk on or from the drive, or loading the optical head section.

Accordingly, it is required for the optical pickup to adjust the distance between the optical disk and the lens to be of several hundred nm, and to maintain stability from external shock or the collision.

SUMMARY OF THE INVENTION

Various objects and advantages of the invention will be set forth in part in the description that follows and, in part, will be obvious from the description, or may be learned by practice of the invention.

An object of the present invention is to provide an optical pickup for an optical disk drive and driving method thereof to minutely control an optical head section by using a low amount of power and realizing a high density drive.

Another object of the present invention is to provide an optical pickup for an optical disk drive having an improved structure and a driving method thereof enhancing stability of the optical head and optical disk from external shock.

The above and other objects are accomplished by providing an optical pickup for an optical disk drive holding an optical disk, the optical pickup including a base; an object lens; a slider supporting the object lens, wherein the object lens focuses a light on a recording surface of the optical disk; an optical head section including the slider, wherein the slider is floated by an air bearing generated between the optical head section and the optical disk; wire suspensions movably supporting the optical head section with respect to the base; a driving unit driving the optical head section in a tracking direction and a focusing direction; and a latching unit selectively securely positioning the optical head section at a predetermined distance away from the optical disk, preventing the optical head section from colliding with the optical disk.

The above objects are also accomplished by a driving method for an optical pickup comprising an optical head section, the driving method including: loading and floating the optical head section in a loading direction towards an optical disk; maintaining the predetermined distance by an air bearing; recording or reproducing data on or from the optical disk with the optical head section in a loaded state; and unloading the optical head section away from the optical disk when the optical head section or the optical disk operates abnormally.

The above and other objects are also accomplished by an optical head loading method to protect an optical head section in an optical pickup and an optical disk from external shock, including: securely positioning the optical head section in the optical pickup at a distance from the optical disk; detecting whether an external shock in the optical pickup is less than or equal to a predetermined base value affecting the optical pickup; supplying electric current to a focusing coil in the optical pickup in a predetermined direction to drive the optical head section in a loading direction away from the secured position towards the optical disk if the detecting of the external shock is less than or equal to the predetermined base value; generating an air bearing between the optical disk and the optical head section by an elastic force from wire suspensions supporting the optical head section with respect to the base; stopping the electric current to the focusing coil to remove the loading force provided to the optical head section; maintaining the air bearing generated between the optical disk and the optical head section; and recording or reproducing data on or from the optical disk.

The above and other objects are also accomplished by an optical head unloading method to protect an optical head section in an optical pickup and an optical disk from external shock, including: detecting whether an external shock in the optical pickup is greater than a predetermined base value; supplying electric current to a focusing coil in the optical pickup in a predetermined direction to drive the optical head section downward in an unloading direction if the detecting of the external shock is greater than the predetermined base value; and securely positioning the optical head section at a predetermined distance from the optical disk.

The above and other objects are also accomplished by an optical head unloading method to protect an optical head section in an optical pickup and an optical disk from external shock, including: detecting an external shock in the optical pickup greater than a predetermined base value; stopping supply of electric current to a spindle motor in the optical pickup in response to detecting the external shock, wherein the spindle motor generates a counter electric voltage until the spindle motor stops; applying the generated counter electric voltage as an unloading force onto the optical head section; moving the optical head section downward in an unloading direction; and securely positioning the optical head section at a predetermined distance from the optical disk.

The above and other objects are also accomplished by an optical head unloading method to protect an optical head section in an optical pickup and a disk cartridge from external shock, including: mounting or removing the disk cartridge; detecting whether an external shock in the optical pickup is greater than a predetermined base value; supplying electric current to a focusing coil in the optical pickup in a predetermined direction to drive the optical head section downward in an unloading direction if the detecting of the external shock is greater than the predetermined base value; and securely positioning the optical head section at a predetermined distance from the disk cartridge.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objects and advantages will be more apparent by describing the preferred embodiment of the present invention with reference to the accompanied reference drawings, in which.

DETAILED DESCRIPTION OF THE PREFERRED EMBODIMENTS

Figure 1:
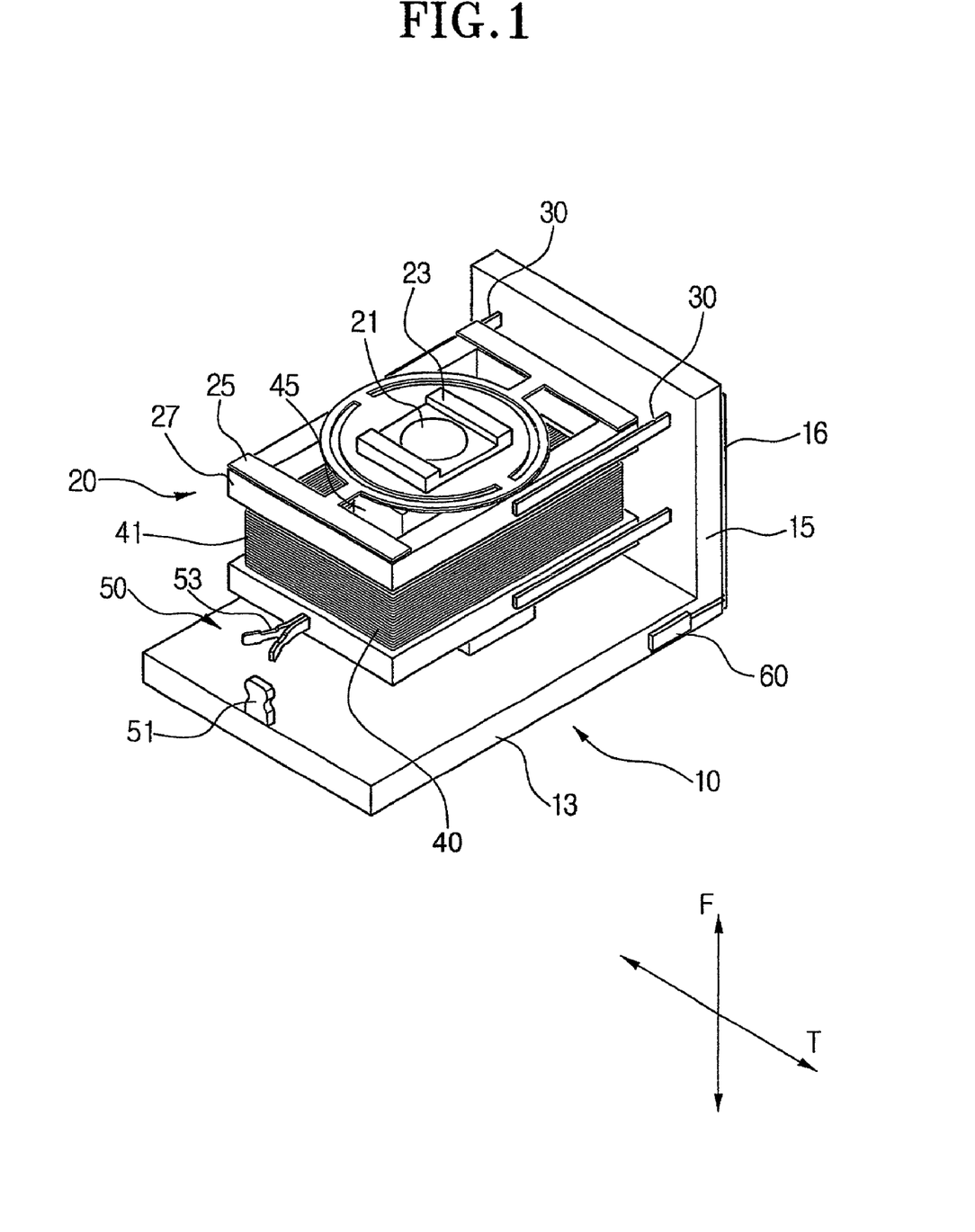
FIG. 1 is a schematic perspective view showing an optical pickup for an optical disk drive according to a first embodiment of the present invention.
Figure 2:
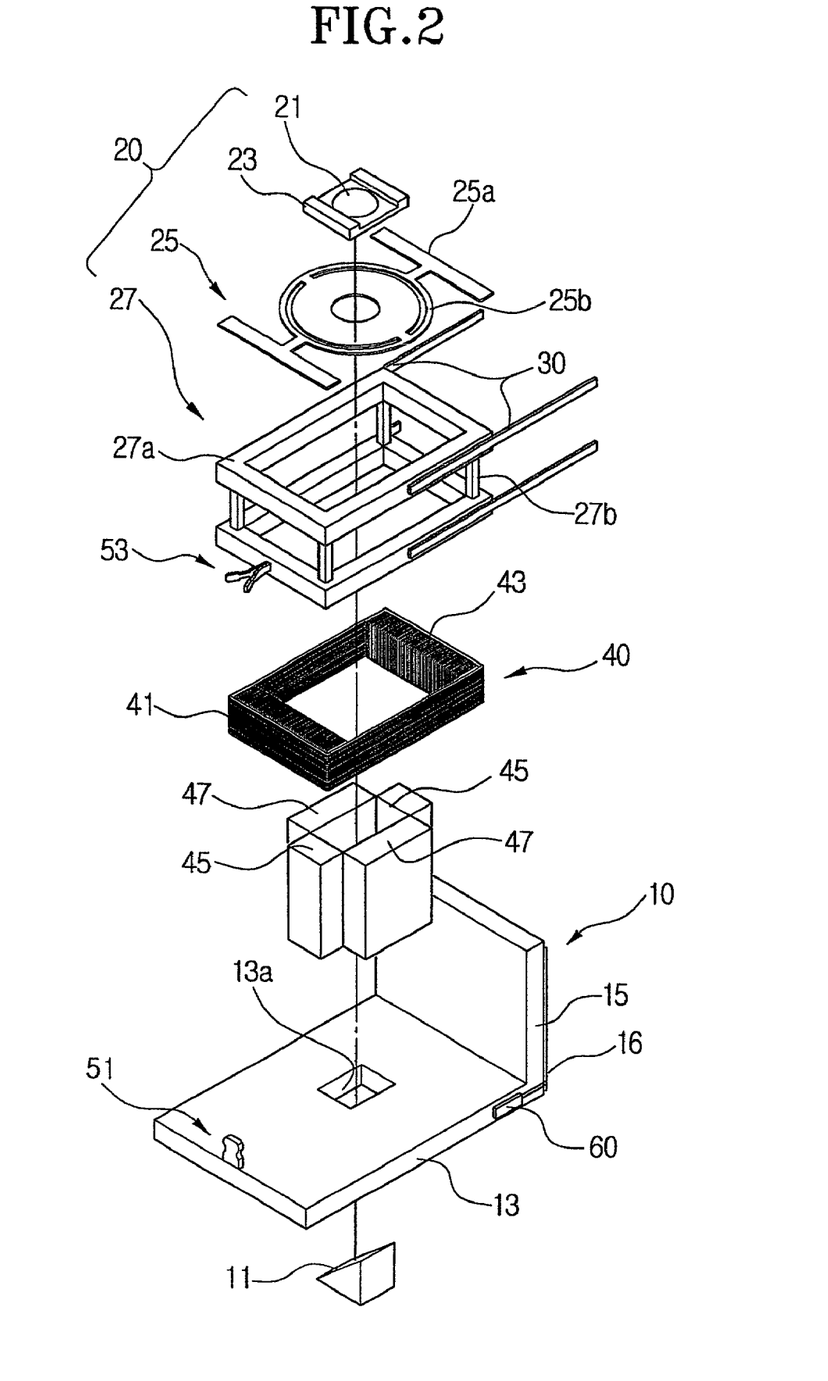
FIG. 2 is a schematic exploded perspective view showing the optical pickup of FIG. 1.

As shown in FIGS. 1 and 2, an optical pickup of an optical disk drive according to a first embodiment of the present invention comprises a base 10, an optical head section 20 including an object lens 21, four (4) wire suspensions 30, a driving unit 40, and a latching unit 50.

The base 10 has a bottom 13 for supporting a mirror 11 which reflects an incident light to the object lens 21 and a sidewall 15 which protrudes in a substantially perpendicular relation with respect to the bottom 13. The bottom 13 is substantially in parallel with an optical disk (not shown), and has a passage hole 13a for permitting a light reflected from the mirror 11 to pass therethrough. The sidewall 15 is integrally formed with the bottom 13, and supports the wire suspensions 30. An electronic circuit section 16 is also installed on the sidewall 15 for controlling the driving of the optical head section 20 and the driving unit 40.

Figure 3:
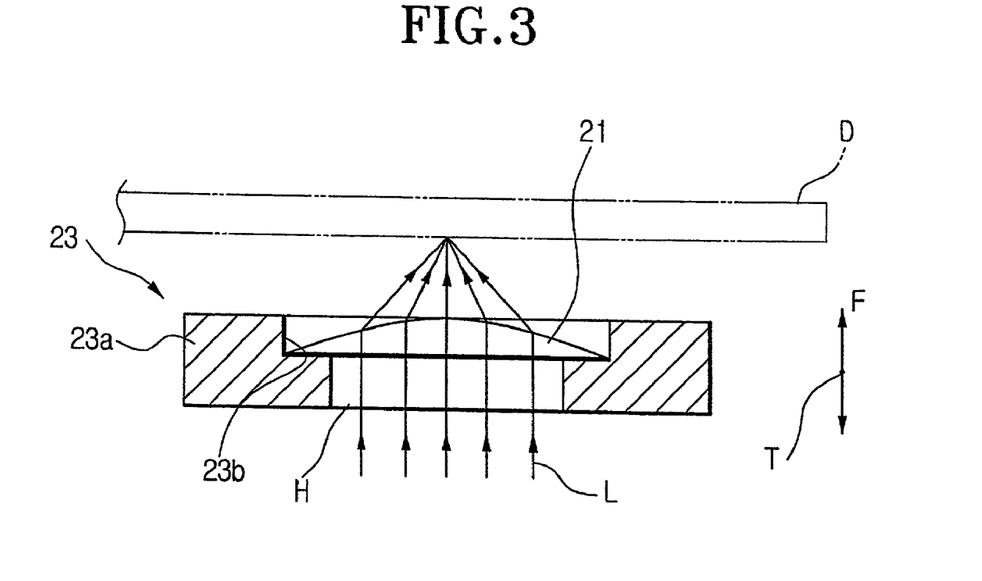
FIG. 3 is a schematic section view showing the main portion of an optical head section of the optical pickup of FIG. 1.

The optical head section 20 comprises a slider 23 for supporting the object lens 21, a flexure 25 holding the slider 23 thereon, and a coil bobbin 27 for supporting the flexure 25. The object lens 21 focuses an incident light reflected from the mirror 11 on a recording surface of the optical disk. The slider 23 forms a near field with respect to the optical disk while being floated toward the optical disk by an air bearing. For this, as shown in FIG. 3, the slider 23 has a receiving section 23b dented from an air bearing surface 23a to receive the object lens 21, and a light passage hole, H, corresponding to the receiving section 23b for permitting a light to pass therethrough.

Referring to FIGS. 1 and 2, the flexure 25 provides the slider 23 with the degree of freedom to move within a predetermined range while the slider 23 is being floated by the air bearing. Thus, the flexure 25 provides the slider 23 with the degree of freedom for a rolling and pitching movement. For this, the flexure 25 includes a supporting section 25a supported by the coil bobbin 27 and a seating section 25b for the slider 23, the seating section 25b extends from the supporting section 25a and the seating section 25b is elastically deformable by an external force. A hole for permitting the light to pass therethrough is formed in a center portion of the seating section 25b.

The coil bobbin 27 comprises a pair of frames 27a symmetrical with each other and a plurality of columns 27b supportively connected to the frames 27a. The respective frames 27a have an empty space in a center portion thereof. For example, each frame 27a may be a square frame having an opening formed therein. Accordingly, magnets (will be described below) are freely intercalated and the light can pass therethrough. Also, the wire suspensions 30 are connected to the outer side of the frames 27a, respectively. The wire suspensions 30 and the frames 27a are connected with each other by a jointing method generally known to the public, for example, welding or winding or the like. The optical head section 20 serves as one assembly and is movably supported by the wire suspensions 30 with respect to the base 10. Thus, the wire suspensions 30, of which the ends are fixed to the sidewall 15 of the base 10, move the optical head section 20 in the focusing and tracking directions F and T, while being bent by an external force. The wire suspensions 30 provide the optical head section 20 with a so-called gram-load in the focusing direction F so that the slider 23 forms a near field between the optical pickup and the optical disk D while being floated by the air bearing surface 23a. For this, the wire suspensions 30 are made of a metallic material of a predetermined rigidity having an elastical recovering force with respect to the focusing direction F. Further, the wire suspensions 30 may also be electrically connected to the electronic circuit section 16 through the base 10. Thus, the wire suspensions 30 may also function as a conductor for supplying electric current to a focusing coil 41 and tracking coils 43 which will be described hereinafter.

Figure 4:
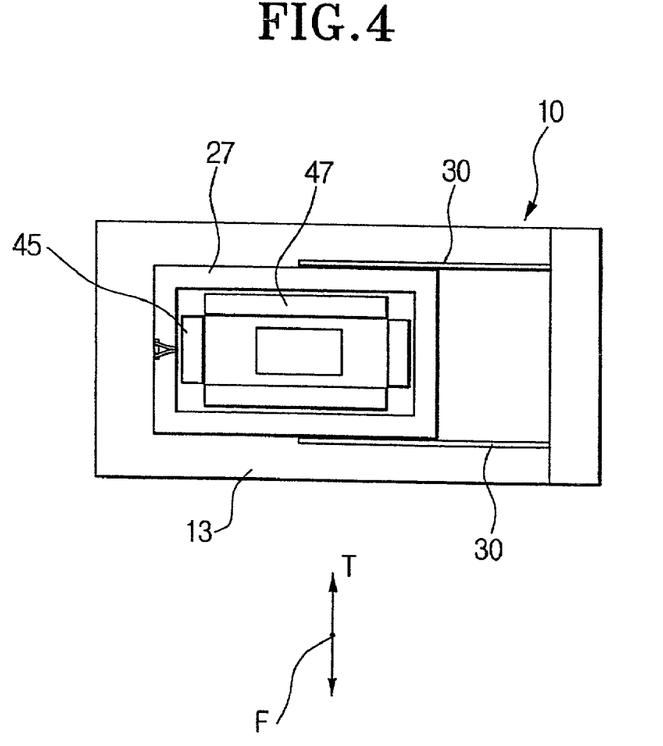
FIG. 4 is a plan view showing the optical pickup of FIG. 1.

The driving unit 40 provides an external force for moving the optical head section 20 in the focusing and tracking directions F and T. Such a driving unit 40 includes the focusing coil 41 for providing the optical head section 20 with an external force in the focusing direction F, the tracking coils 43 for providing the optical head section 20 with an external force in the tracking direction T and a plurality of driving magnets 45 and 47 which are disposed to correspond to the focusing coil 41 and the tracking coils 43. The focusing coil 41 is wound around the columns 27b of the coil bobbin 27. The tracking coils 43 are oppositely disposed inside of the focusing coil 41 at a predetermined distance from each other. The magnets 45 and 47 are disposed at the bottom 13 of the base 10 facing the focusing coil 41 and the tracking coils 43. As shown in FIG. 4, the magnets 45 and 47 are positioned so that the magnets do not interfere with the inner side of the coil bobbin 27. When the electric current is applied to the focusing coil 41 and the tracking coils 43 in a predetermined direction, the magnets 45 and 47 minutely move the optical head section 20 in the focusing and tracking directions F and T by a magnetic force generated from interaction between the focusing and tracking coils 41 and 43 and the magnets 45 and 47.

Figure 5A:
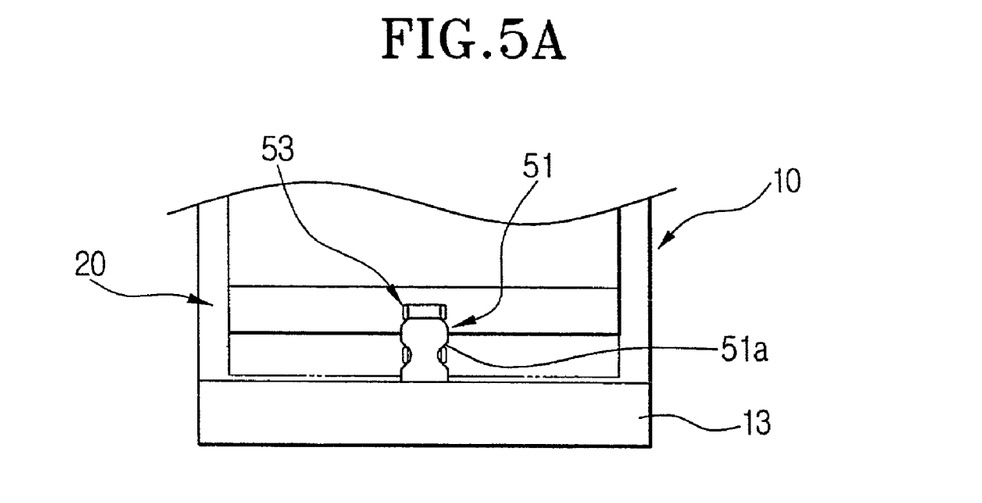
FIG. 5A is a side elevation view showing the optical pickup of FIG. 1.
Figure 5B:
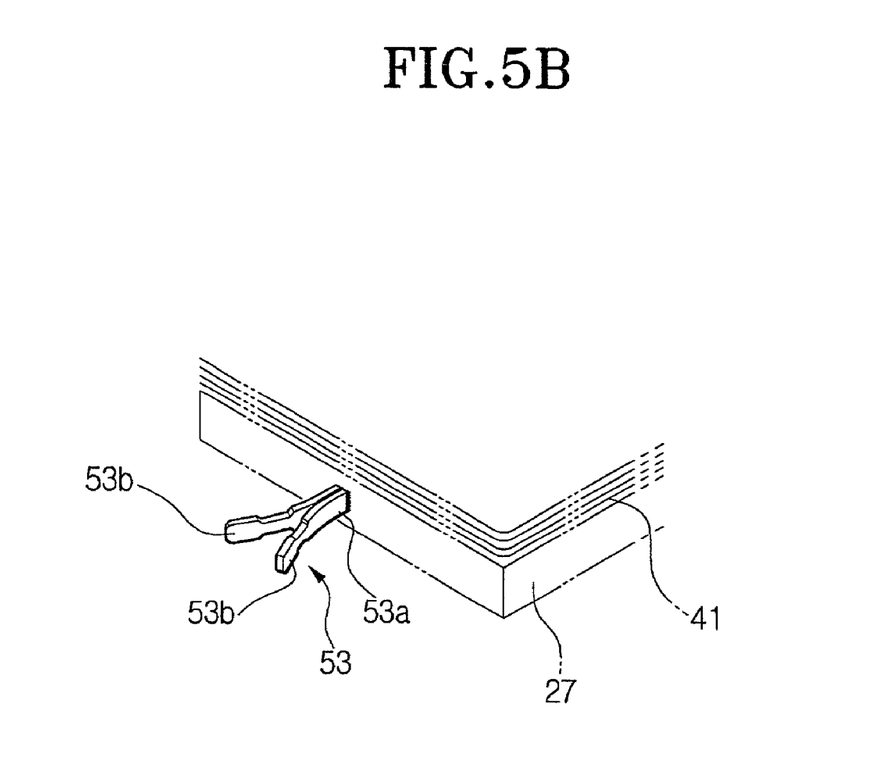
FIG. 5B is a partially perspective view showing a tang of the optical pickup of FIG.1.

The latching unit 50 includes a ramp 51 formed on the base 10 and a tang 53, corresponding to the ramp 51, formed on the optical head section 20. As shown in FIG. 5A, the ramp 51 protrudes from the bottom 13 of the base 10 and has a neck 51a recessed from both sides for being clamped by the tang 53. As shown in FIG. 5B, the tang 53 includes a body 53a fixed to the coil bobbin 27 and a pair of clamping sections 53b branched from the body 53a. The tang 53 is elastically deformable and recoverable by contact with the ramp 51. The tang 53 is made of a metallic plate spring. When the optical head section 20 is unloaded, the clamping sections 53b descend in the focusing direction F and then contact with an upper side of the ramp 51. At this time, as shown in FIG. 5A, the clamping sections 53b descend along the profile of the ramp 51 and clamp onto the neck 51a. When the tang 53 clamps to the ramp 51, the optical head section 20 is securely positioned at a distance from the optical disk D in the unloaded state even though the supply of the electric current to the focusing coil 41 is stopped.

Additionally, it is desirable to install a shock detecting sensor 60, as shown in FIG. 1 and FIG. 2, on the base 10 for detecting a shock externally transmitted to the base 10. Preferably, the shock detecting sensor 60 is a piezo-sensor. The shock detecting sensor 60 detects a quiver affecting the optical head section 20 and the base 10, that is, a level of shock. The detected level of shock is transmitted to the electronic circuit section 16. The electronic circuit section 16 compares the detected level of shock with a predetermined base value, and determines whether or not to unload the optical head section 20. In the alternative, the shock detecting sensor 60 may also be installed on the optical head section 20.

Figure 6:
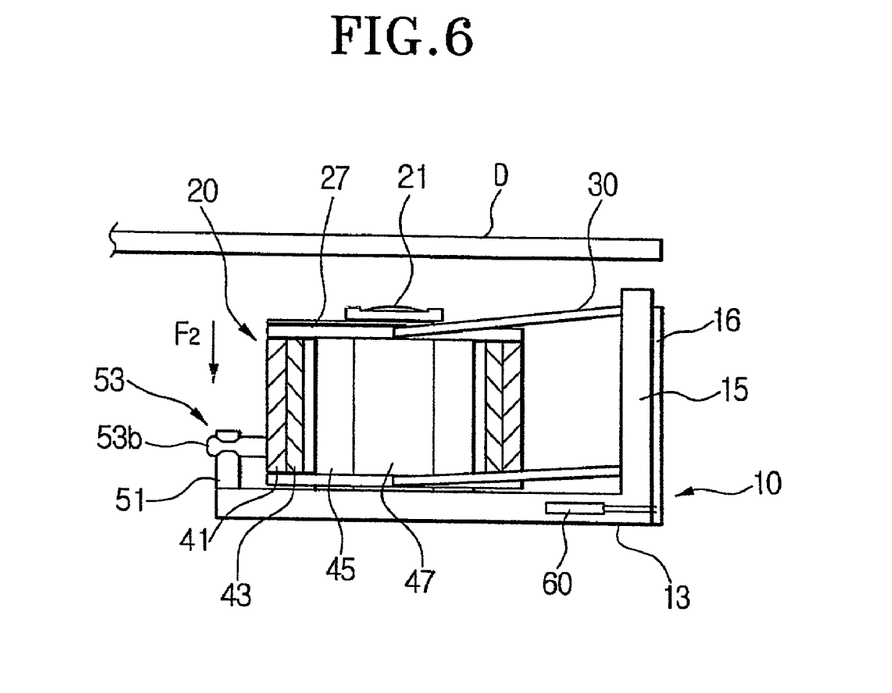
FIG. 6 is a schematic front view showing the optical head section being unloaded.
Figure 7:
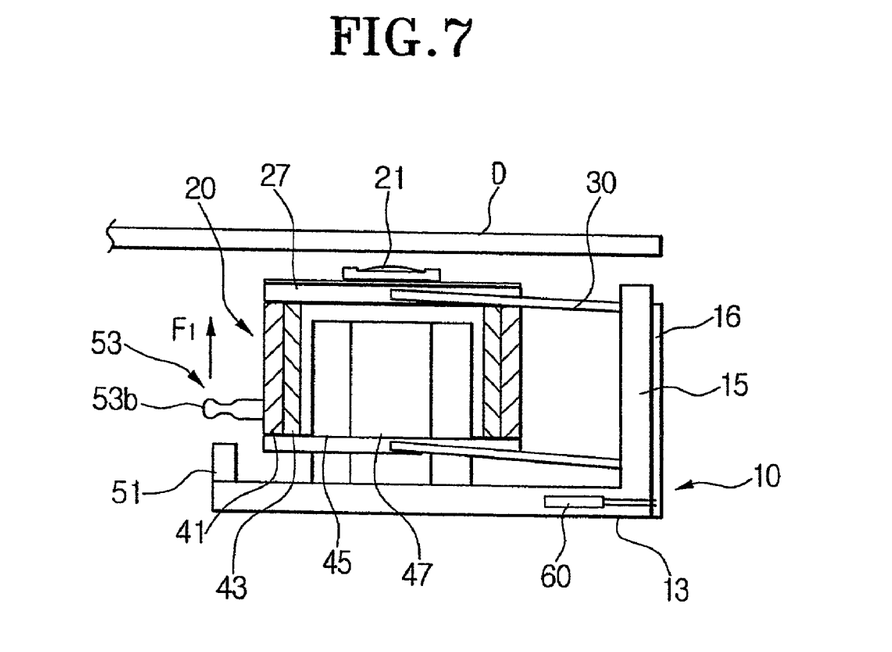
FIG. 7 is a schematic front view showing the optical head section being loaded.
Figure 8:
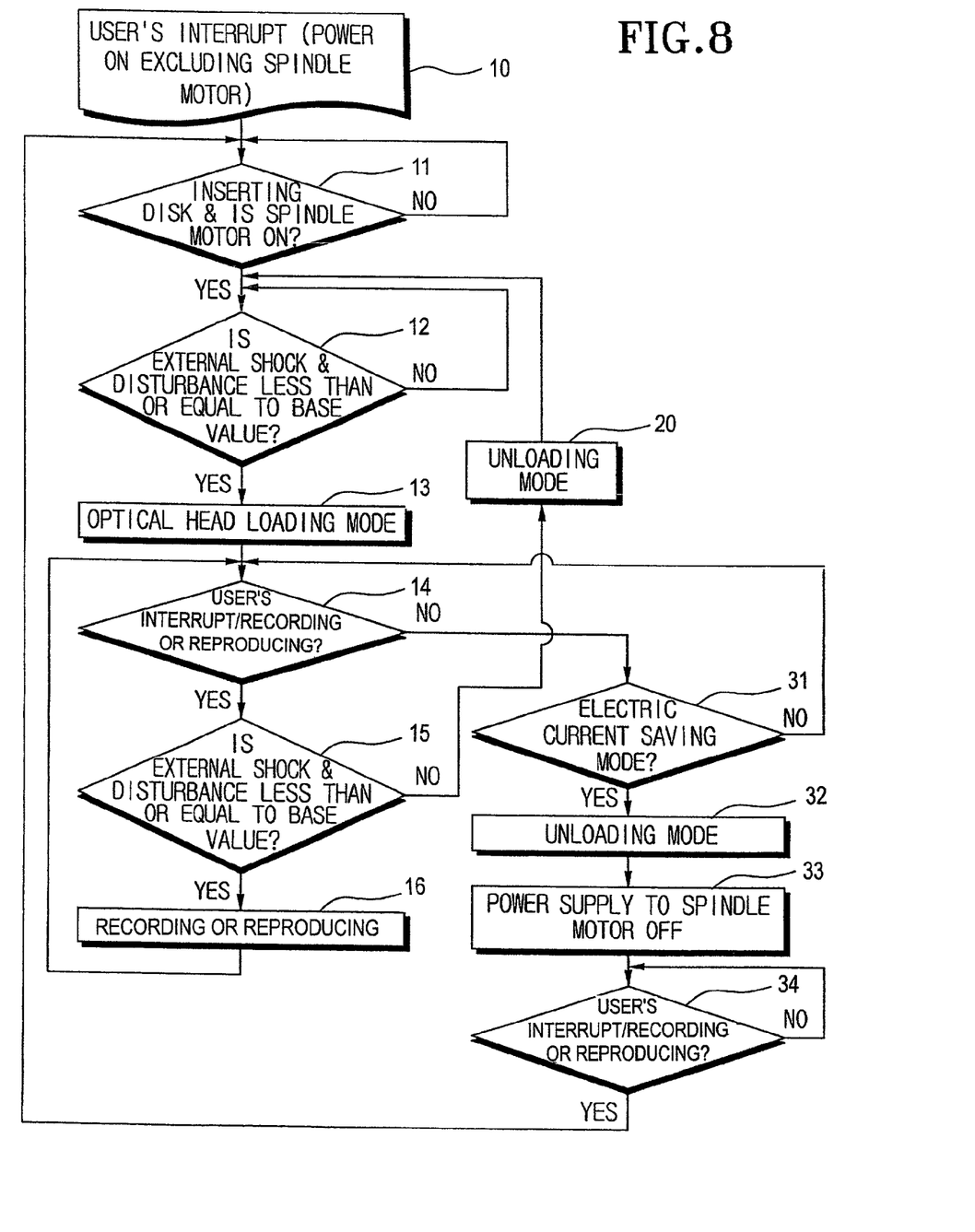
FIG. 8 is a flowchart illustrating a driving method of the optical pickup according to an exemplary embodiment of the present invention.

The driving method for the optical pickup for the optical disk drive constructed as above according to an embodiment of the present invention is explained below in detail referring to the FIGS. 6 through 11 as follow. As shown in FIGS. 6 and 8, initially, the optical head section 20 is kept in the unloaded state by the ramp 51 which is clamped to the tang 53. When the optical disk drive is unloaded, power is supplied to all the electronic elements excluding the driving apparatuses, such as a spindle motor and a pickup. In such an unloaded state, at operation 10, a user interrupts, that is, the user inputs an operation command to the driver through an input section. At operation 11, a micro-computer or DSP(Digital-Signal Processor) (not shown) in the electronic circuit section 60 determines whether the optical disk D is inserted into the drive and whether the power is normally supplied to the spindle motor to be rotated. If the optical disk D is inserted into the drive and the spindle motor is normally rotating, at operation 12, the shock detecting sensor 60 detects whether a external shock or external disturbance affects the base 10, the optical head section 20, and the spindle motor and determines whether the detected level of shock is less than or equal to a predetermined base value. If the detected level of shock is less than or equal to the base value, at operation 13, the optical head section 20 is loaded to a predetermined distance from the optical disk D to form a predetermined near field between the optical head section 20 and the optical disk D that permits the optical head section 20 to record or reproduce the data.

Figure 9:
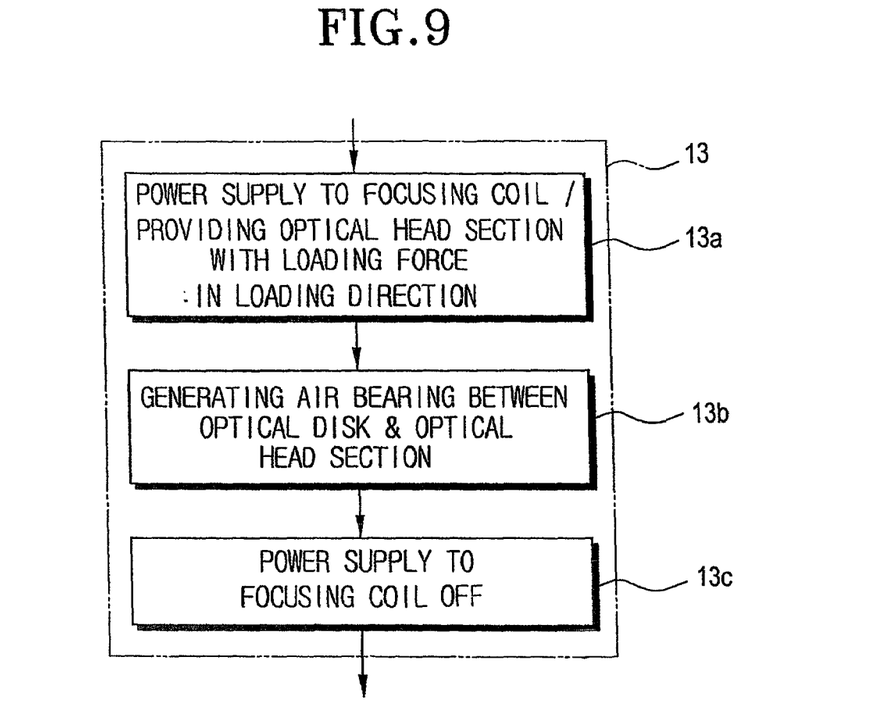
FIG. 9 is a flowchart illustrating a method of an optical head loading mode.

FIG. 9 is a flowchart illustrating the optical head loading mode of operation 13 of FIG. 8. At operation 13a, the electric current is applied to the focusing coil 41 in a predetermined direction so as to provide the optical head section 20 with a so-called loading force in a loading direction F1, towards the optical disk D. As shown in FIG. 7, if the electric current is applied to the focusing coil 41 in a predetermined direction, and the optical head section 20 receives the loading force in the loading direction F1 due to the interaction between the focusing coil 41 and the driving magnets 45 and 47. The tang 53 is unclamped, that is, elastically deformed and separated from the ramp 51 by the loading force, and the optical head section 20 is floated away from the base 10. Referring to FIG. 9, at operation 13b, if the optical section 20 is floated in the loading direction F1, an air bearing is generated between the optical disk D and the slider 23. As shown in FIG. 7, due to the air bearing, the slider 23 maintains a so-called near field, i.e., a distance of several hundred nm between the slider 23 and the optical disk D. Referring to FIG. 9, at operation 13*c*, if the air bearing is generated between the optical head section 20 and the optical disk D the supply of the electric current applied to the focusing coil 41 is stopped to remove the loading force provided to the optical head section 20. Without the loading force to the optical head section 20, the air bearing previously generated between the optical head section 20 and the optical disk D is maintained. That is, the air bearing is maintained by the so-called gram-load generated by the elastic force from the wire suspensions 30 and thus the near field is also maintained. Accordingly, after the electric current is applied to the focusing coil 41 to provide the loading force for a predetermined time, the loaded state of the optical head section 20 can be maintained even without the electric current. Because it is not necessary to continuously apply the electric current, the power consumption can be reduced accordingly.

Referring to FIG. 8, in the loaded state, at operation 14, if the user inputs a command signal for recording or reproducing the data within a predetermined time, the shock detecting sensor 60 detects whether the external shock or external disturbance affects the entire system including the optical head section 20, and, at operation 15, determines again whether the detected level of shock is less than or equal to a predetermined base value. If the detected level of shock is less than or equal to the base value, at operation 16, the optical pickup records or reproduces the data on or from the optical disk D while focusing the light on the optical disk D. At this time, the electronic circuit section 16 supplies the electric current to the tracking coils 43 to securely position the optical head section 20 in the tracking direction T and minutely control the optical focusing position. After operation 16, the loaded state is maintained until another command is inputted.

If at operation 15, the detected level of shock is greater than a predetermined base value, at operation 20, the optical head section 20 returns to the unloaded state as shown in FIG. 6 so that the system is protected from collision between the optical head section 20 and the optical disk D. Operation 20 is explained in greater detail in FIG. 10.

Figure 10:
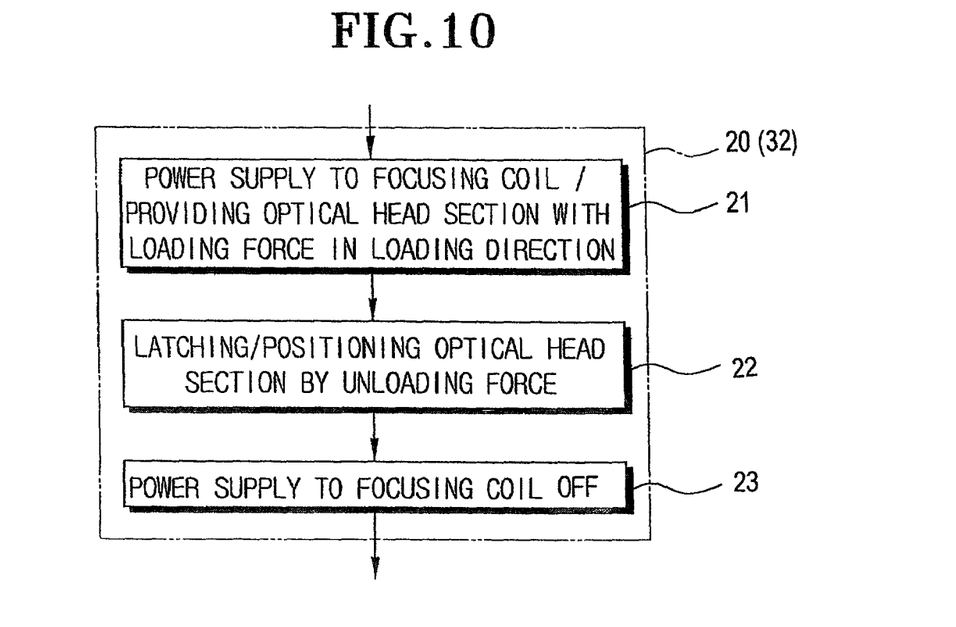
FIG. 10 is a flowchart illustrating a method of an optical head unloading mode.

At operation 15, if the level of shock is greater than the base value, at operation 21 in FIG. 10, the electric current is applied to the focusing coil 41 in a predetermined direction in order to generate the unloading force toward the unloading direction F2. Thereby, the optical head section 20 is subject to the unloading force in the unloading direction F2 by the interaction between the focusing coil 41 and the magnets 45 and 47. Accordingly, the optical head section 20 moves downward by the unloading force and the optical head section 20 is then securely positioned by the latching unit 50, and, thus, the unloaded state is maintained. As shown in FIG. 5A, the tang 53 contacts with upper side of the ramp 51 when the optical head section 20 descends due to the unloading force. At this time, as the optical head section 20 forcedly descends further and the clamping sections 53*b* descend along the profile of the ramp 51 and clamp the neck 51*a*.

Referring to FIG. 10, at operation 23, when the clamping sections 53*b* contact with the neck 51*a*, the supply of the electric current to the focusing coil 41 is stopped. Even if the supply of the electric current is stopped, the optical head section 20 is securely positioned in an unloaded state by the so-called latching force including the friction force between the ramp 51 and the tang 53. In such an unloaded state, the distance between the slider 23 and the optical disk D is maintained at about 5 mm. Therefore, it is possible to prevent the optical head section 20 from quivering on repeatedly shaking up and down by the external shock. It is also possible to stabilize the system by protecting the optical disk D and the optical head section 20 from collision.

Referring to FIG. 8, at operation 20, the shock is removed in the unloaded state, and at operation 13, the loading is performed again. At operation 14, if the user does not input the interrupt signal, at operation 31, the electronic circuit section 16 determines whether to perform a electric current saving mode according to whether a predetermined base time elapses or not. If there is no interrupt signal input for a predetermined time after the loading mode, at operation 32, an unloading mode for unloading the optical head section 20 is performed. Here, at operation 32, operations 21 to 23 illustrated in FIG. 10 are performed. While performing operations 21 to 23, the optical head section 20 is securely positioned with respect to the base 10 by the latching unit 50. Referring to FIG. 8, at operation 33, if the electric current supply to the spindle motor is stopped, the rotation of the optical disk D is stopped. The optical disk D may also be rotated at a low speed by reducing the revolution per minute (RPM) rather than completely stopping the supply of the electric current to the spindle motor.

Meanwhile, at operation 34 the microcomputer or DSP determines whether the user inputs the command signal for recoding or reproducing the data. If the user inputs the command signal at operation 34, operations 11, 12, and 13 are sequentially performed again.

Figure 11:
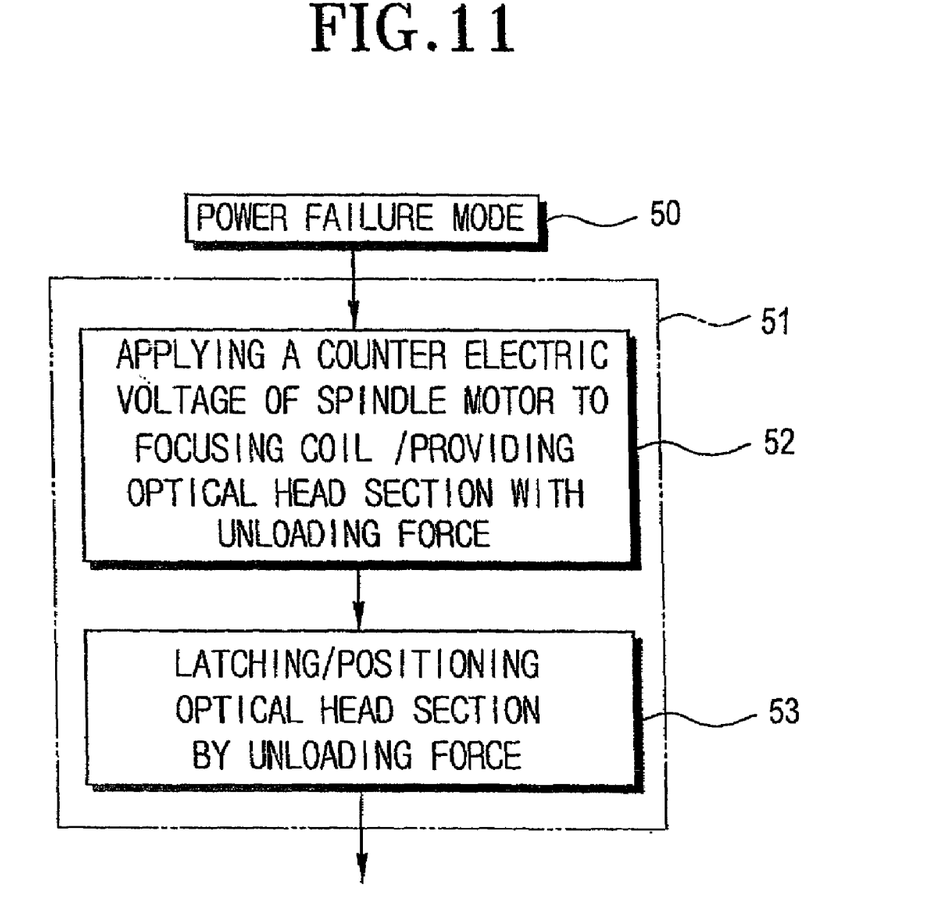
FIG. 11 is a flowchart illustrating a method of a power failure mode.

As described above, the unloading mode at operation 20 to protect the optical head section 20 from the external shock and disturbance or the unloading mode at operation 32 for saving the electric current is performed before/after loading the optical head section 20. As shown in FIG. 11, however, if power failure occurs due the shock to the apparatus, at operation 50, the optical head section 20 performs a power failure mode and unloads the optical head section 20 at operation 51. If the power failure occurs suddenly during the loading operation 13 or data recording or reproducing operation 16, the supply of the electric current to the entire system including the spindle motor is stopped. At this time, the spindle motor rotated at high speed gradually loses its speed, generating counter electric voltage until the spindle motor is stopped. If such generated counter electric voltage is applied to the focusing coil 41 at operation 52, the unloading force is exerted to the optical head section 20. Accordingly, the optical head section 20 descends in the unloading direction F2 by the unloading force generated by the counter electric voltage of the spindle motor, and at operation 53, the optical head section 20 is securely positioned by the latching unit 50. Accordingly, even if the driver falls, in the event of the severe shock or power failure, the optical head section 20 can be unloaded using the counter electric voltage of the spindle motor without requiring extra supplementary power. Therefore, the stability of the apparatus is improved by protecting the optical head section 20 and the optical disk D from damage.

Figure 12:
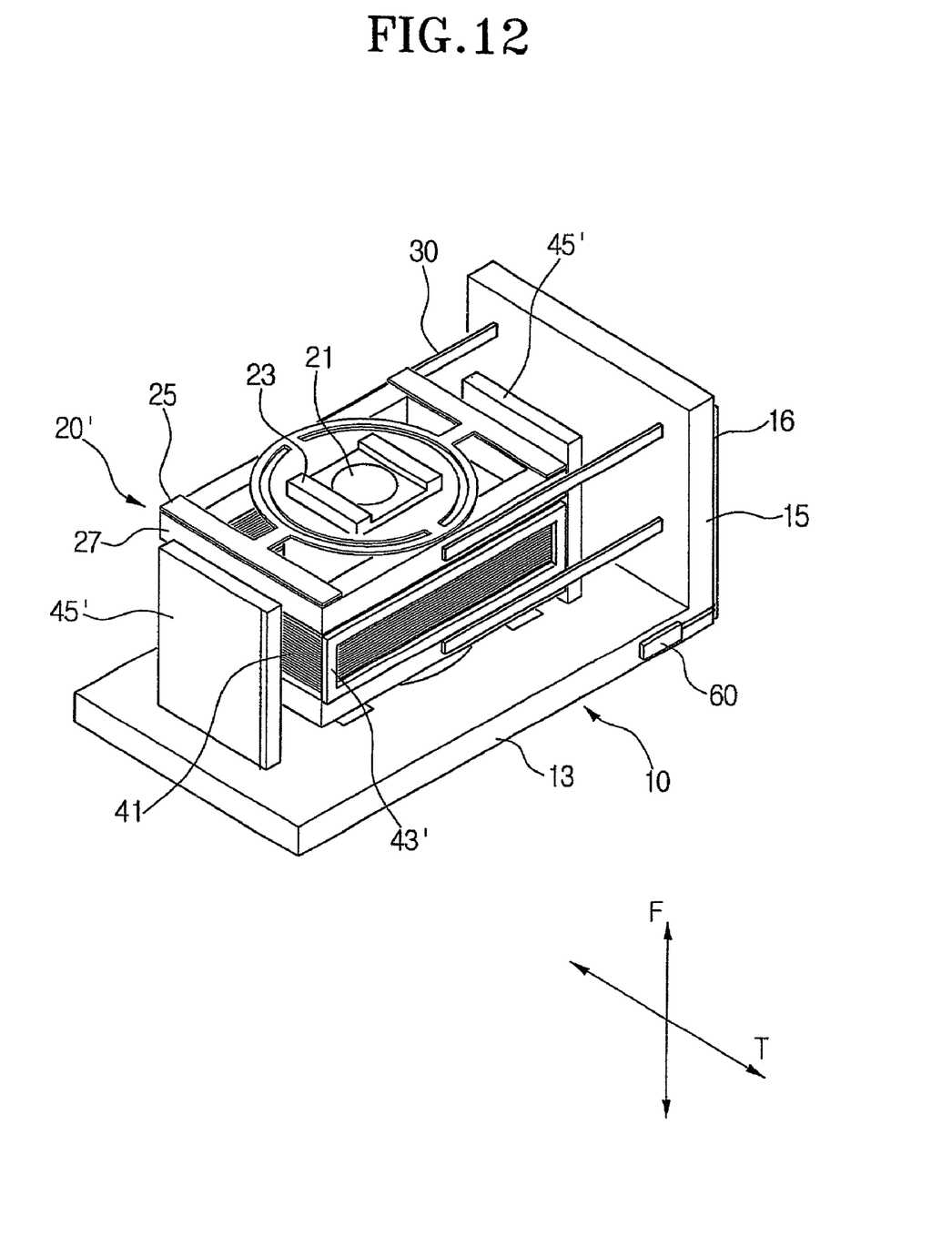
FIG. 12 is a schematic perspective view showing an optical pickup for an optical disk drive according to a second embodiment of the present invention.
Figure 13:
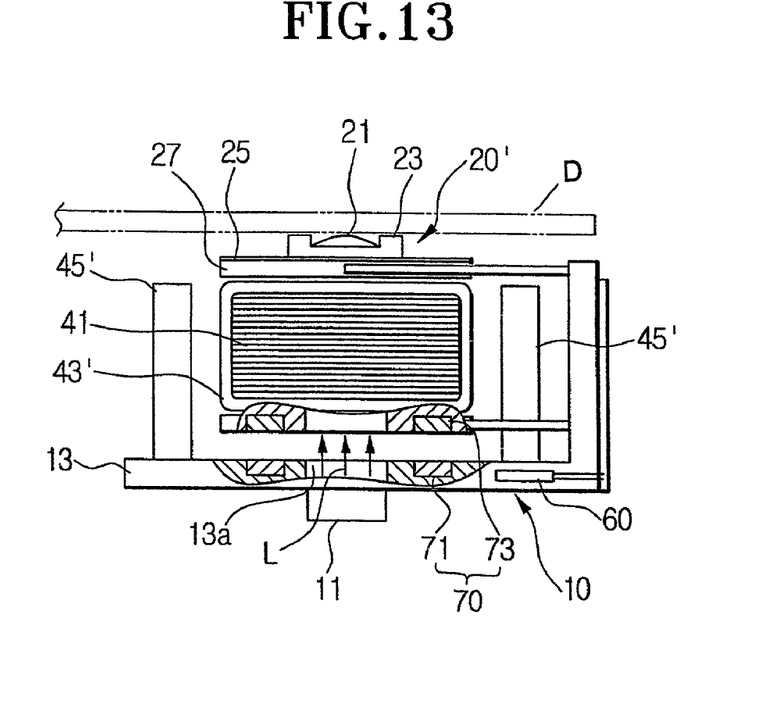
FIG. 13 is a schematic front view showing the optical pickup of FIG. 12.

Referring to FIGS. 12 and 13, an optical pickup for an optical disk drive according to a second embodiment of the present invention is described in greater detail below. Here, elements identical to the elements illustrated in FIGS. 1 and 2 are designated by the same reference numbers throughout.

Referring to the FIGS. 12 and 13, an optical pickup for an optical disk drive according to the second embodiment of the present invention is described. An optical head section 20' including an object lens 21 and a coil bobbin 27 is movably supported by wire suspensions 30 in focusing and tracking directions F and T with respect to a base 10. A driving unit drives the optical head section 20' in the focusing and tracking directions F and T and includes a focusing coil 41 wound around the coil bobbin 27, tracking coils 43', and driving magnets disposed to correspond to the focusing coil 41 and the tracking coils 43'. Here, the tracking coils 43' are disposed on a front surface and a rear surface of the optical head section 20'. The tracking coils 43' also have a predetermined magnetic-gap with respect to a pair of magnets 45'. Accordingly, the pair of the magnets 45' are oppositely disposed on a bottom 13 of the base 10 at a predetermined distance from each other, while the optical head section 20' is disposed in between the magnets 45'. The magnets 45' provide the optical head section 20' with the force in the focusing and tracking directions F and T by the interaction between the magnets 45' and the focusing coil 41 and the tracking coils 43' with electric current.

The optical head section 20' is securely positioned in the unloaded state by a latching unit 70 so as to be protected from damage that may occur during a collision with the optical disk D. The latching unit 70 includes a pair of magnets 71 and a pair of metal yokes 73. The magnets 71 are disposed on the bottom 13 of the base 10 at a predetermined distance apart from each other. The metal yokes 73 are disposed on the lower side of the optical head section 20' to correspond to the magnets 71, respectively. Specifically, the magnets 71 are immersed into the bottom 13 of the base 10 to have the same height as the bottom 13, and the metal yokes 73 are immersed into a bottom surface of the coil bobbin 27. The magnetic force between the metal yokes 73 and the magnets 71 is properly set in consideration of a loading force and an unloading force of the optical head section 20', and a movement distance from the gram-load provided from the wire suspension to the focusing direction F.

Figure 14:
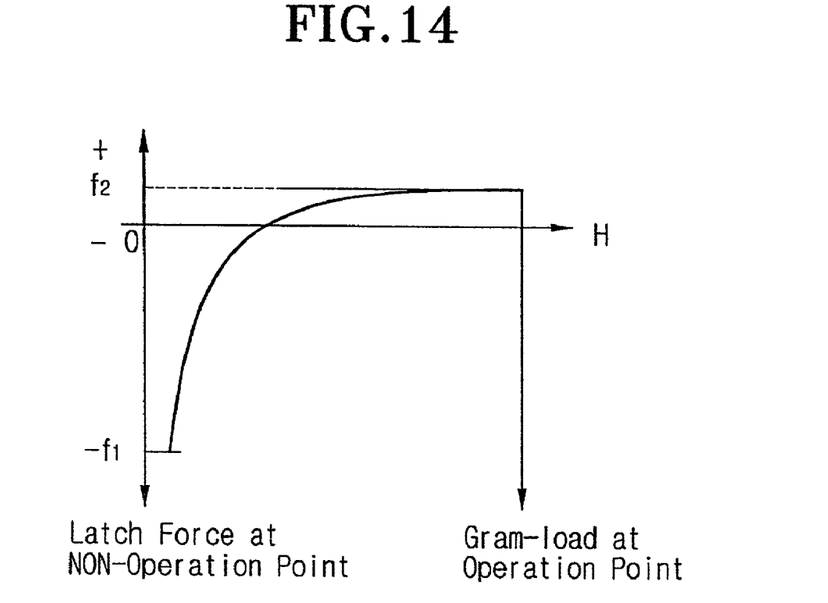
FIG. 14 is a graph showing external force required to load or unload an optical head section of the optical pickup of FIG. 12 according to a floating height of the optical head section.
Figure 15:
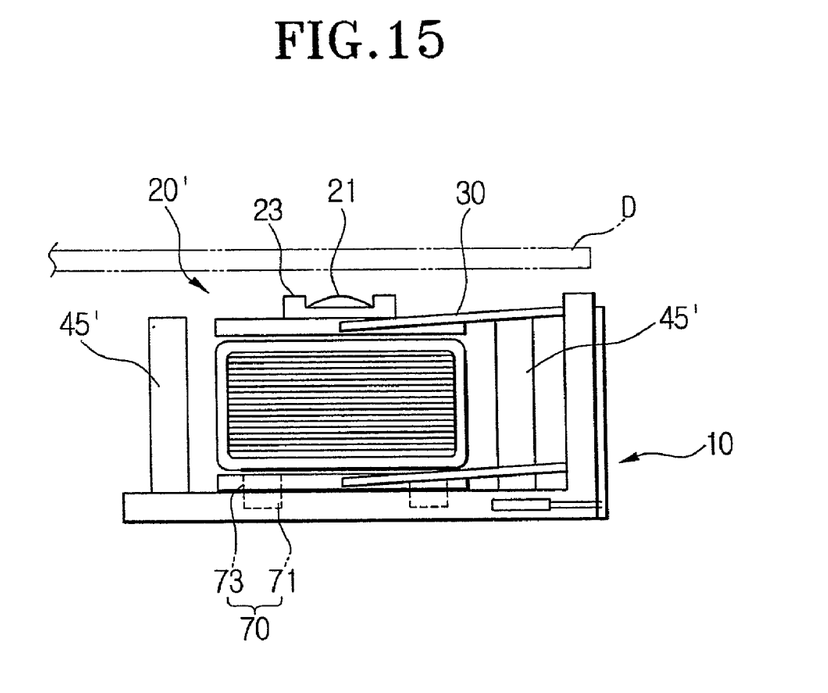
FIG. 15 is a schematic front view showing the optical head section of the optical pickup of being unloaded.
Figure 16:
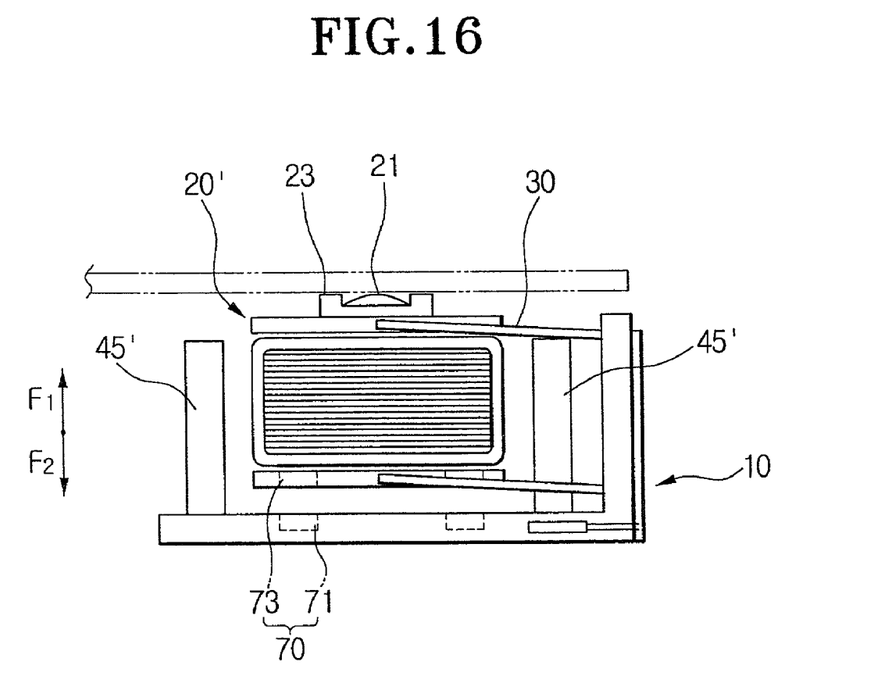
FIG. 16 is a schematic front view showing the optical head section of the optical pickup of being loaded.

The power affecting the optical head section 20' according to an operation phase of the optical head section 20' is shown in FIG. 14. As shown in FIG. 14, if the maximum distance between the slider 23 and the optical disk D is about 5 mm in the unloaded state of the optical head section 20', the power affecting the optical head section 20' is different according to the floating height of the optical head section 20'. In the state that the magnets 71 and the metal yokes 73 are in contact with each other due to the magnetic force between them as shown in FIG. 15, the optical head section 20' is restricted under the magnetic force, that is, a latching force (−f1) in the unloading direction F2. At this time, if the electric current is applied to the focusing coil 41, the focusing force, i.e. a loading force (+f1) is generated by the focusing coil 41. Accordingly, the optical head section 20' is floated by the loading force (+f1), overcoming the latching force (−f1). The optical head section 20' is moved to a balancing position, i.e., to a magnetic force free position where the level of the external force is zero. The electric current is applied to the focusing coil 41 until the optical head section 20' moves to the balancing position. That is, the supply of the electric current is stopped when there is zero force moving the optical head section 20'. Even without the supply of power, in the external force zero state as shown in FIG. 16, the optical head section 20' maintains a near field of several hundred nm with respect to the optical disk D by the air bearing generated between the optical disk D and the slider 23.

The optical head section 20' can maintain the near field without the supply of power due to a gram-load (+f2) from the wire suspensions 30. That is, the optical head section 20' maintains the near field by the gram-load provided from the wire suspensions 30 without extra force toward the focusing direction F. The magnetic circuits are also properly designed for the magnetic force generated between the magnets 71 and 45' to be the same as the gram-load of the wire suspensions 30 so that the optical head section 20' maintains a balanced position. Meanwhile, in the loaded state of the optical head section 20', the electric current is applied to the tracking coils 43 for recording or reproducing the data, and the optical pickup records or reproduces the data while adjusting the optical focusing position with respect to the optical disk D.

Further, if the shock detecting sensor 60 detects an external shock or disturbance in the loaded state of the optical head section 20', the microcomputer and DSP provide the focusing coil 41 with an unloading force (−f2) in the unloading direction F2, to overcome the gram-load (f2). Thereby, the optical head section 20' is moved out of the gram-load (f2) range by the unloading force (−f2). If the optical head section 20 is moved out of the gram-load (f2), the optical head section 20' is positioned at a predetermined position where the optical head section 20' is subjected to the magnetic force, i.e. the latching force (−f1). At this time, even if the supply of the electric current to the focusing coil 41 is stopped, the optical head section 20' is unloaded and securely positioned as shown in FIG. 15. Accordingly, when external shock and external disturbances occur, the optical head section 20' is moved to be latched so that the system is prevented from being out of order due to the collision between the optical head section 20' and the optical disk D. Additionally, the optical head section 20' can be loaded and unloaded with minimum electric current from the focusing coil 41 reducing the power consumption accordingly.

Because the driving method of the optical pickup of the optical disk drive according to the second embodiment of the present invention as described above is substantially identical to the driving method as described in FIGS. 8 through 11, the description is omitted here, while the latching unit employed for the unloaded state has been described with reference to FIG. 14.

As described above, the optical pickup for the optical disk drive according to the present invention has advantages, for example, as follows. First, if shock or disturbance occurs while mounting or removing a disk cartridge because the optical head section 20 or 20' is unloaded and latched, the collision between the optical head section 20 or 20' and the optical disk D is prevented and, thus, damage to the system is prevented. Second, because the electric current is applied only when converting a loaded state into an unload state and vice versa, the power consumption can be reduced. Third, if the recording or reproducing of data is not performed for a long time, the optical disk drive can be driven at a minimum power in a saving mode. Fourth, because the optical head section 20 or 20' can be controlled to maintain a near field by the air bearing generated by the gram-load of the wire suspensions 30, a high-density drive can be realized. Fifth, even if power failure or sudden damage of the power supply occurs, the optical head section can be unloaded by the counter electric voltage of the spindle motor and can be securely latched without requiring extra supplementary power supply.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical pickup for an optical disk drive holding an optical disk, comprising:
   a base;
   an object lens;
   a slider supporting the object lens, wherein the object lens focuses a light on a recording surface of the optical disk;
   an optical head section comprising the slider, wherein the slider is floated by an air bearing generated between the optical head section and the optical disk;
   wire suspensions movably supporting the optical head section with respect to the base;
   a driving unit to operate in a loaded state in which the optical head section is driven in tracking and focusing directions and an unloaded state in which the optical head section is not driven; and
   a latching unit including a ramp and a tang, one being formed at a position on the optical head section and the other being formed at a corresponding position on the base, the tang being elastically deformed upon contact with the ramp so as to lock and unlock the optical head section in a position relative to the base during an initialization and an ending of the unloaded state.

2. The optical pickup as recited in claim 1, wherein the optical head section further comprises:
   a coil bobbin supporting the slider and connected to the wire suspensions; and
   a flexure disposed between the slider and the coil bobbin, elastically supporting the slider so as to allow the slider to be movable within a predetermined range while the slider is floated by the air bearing toward the optical disk.

3. The optical pickup as recited in claim 2, wherein the coil bobbin comprises frames symmetrical with each other and columns supportively connected to the frames.

4. The optical pickup as recited in claim 2, wherein the driving unit comprises:
   a focusing coil wound around the outside of the coil bobbin;
   tracking coils wound around the inner side of the focusing coil; and
   driving magnets disposed on the base to face the focusing coil and the tracking coils at a predetermined distance from the focusing coil and the tracking coils.

5. The optical pickup as recited in claim 1, wherein the ramp protrudes from the bottom of the base and comprises a neck recessed from both sides of the ramp to supportively contact with the tang.

6. The optical pickup as recited in claim 1, wherein the latching unit comprises magnets and metal yokes oppositely disposed on the base and the optical head section, respectively.

7. The optical pickup as recited in claim 6, wherein the metal yokes are disposed on a lower side of the optical head section to correspond to the magnets, respectively.

8. The optical pickup as recited in claim 1, wherein the base comprises:
   a mirror reflecting the light to the object lens;
   a bottom supporting the mirror; and
   a sidewall protruding perpendicularly with respect to an upper surface of the bottom, supporting the wire suspensions.

9. The optical pickup as recited in claim 1, wherein the optical head section further comprises:
   a coil bobbin for mounting the slider thereon, the coil bobbin connected to the wire suspensions; and
   a flexure disposed between the slider and the coil bobbin for elastically supporting the slider so that the slider can be floated by the air bearing toward the optical disk.

10. An optical pickup for an optical disk drive holding an optical disk, comprising:
    a base;
    an object lens;
    a slider supporting the object lens, wherein the object lens focuses a light on a recording surface of the optical disk;
    an optical head section comprising the slider, wherein the slider is floated by an air bearing generated between the optical head section and the optical disk;
    wire suspensions movably supporting the optical head section with respect to the base;
    a driving unit driving the optical head section in a tracking direction and a focusing direction; and
    a latching unit selectively securely positioning the optical head section at a predetermined distance away from the optical disk preventing the optical head section from colliding with the optical disk, wherein the ramp protrudes from the bottom of the base and comprises a neck recessed from both sides of the ramp to supportively contact with the tang and the tang comprises:
       a body securely formed on the optical head section to correspond to the ramp and
       a pair of clamping sections branched from the body and elastically deformed by a contact with the ramp and recoverable by contact with the ramp.

11. An optical pickup for an optical disk drive holding an optical disk, comprising:
    a base;
    an object lens;
    a slider supporting the object lens, wherein the object lens focuses a light on a recording surface of the optical disk;
    an optical head section comprising the slider, wherein the slider is floated by an air bearing generated between the optical head section and the optical disk;
    wire suspensions movably supporting the optical head section with respect to the base;
    a driving unit driving the optical head section in a tracking direction and a focusing direction; and
    a latching unit selectively securely positioning the optical head section at a predetermined distance away from the optical disk to prevent the optical head section from colliding with the optical disk, wherein the optical pickup further comprises a shock detecting sensor detecting a level of shock externally transmitted to the optical head section or the base, wherein if the level of shock is greater than a predetermined base value, the driving unit drives the optical head section downward in an unloading direction and the latching unit securely positions the optical head section at the predetermined distance from the optical disk.

12. The optical pickup as recited in claim 11, wherein the optical head section is unloaded and securely positioned by the latching unit when the detected level of shock is greater than a predetermined base value.

13. The optical pickup as recited in claim 11, wherein the shock detecting sensor is a piezo-sensor.

14. An optical pickup for an optical disk drive including a base, an optical head, and wire suspensions movably supporting the optical head with respect to the base, the pickup comprising:

a driving unit to operate in a loaded state in which the optical head is driven in tracking and focusing directions and an unloaded state in which the optical head is not driven; and a latching unit including a ramp and a tang, one being formed at a position on the optical head and the other being formed at a corresponding position on the base, the tang being elastically deformed upon contact with the ramp so as to lock and unlock the optical head in a position relative to the base during an initialization and an ending of the unloaded state.

* * * * *